Figure 3:
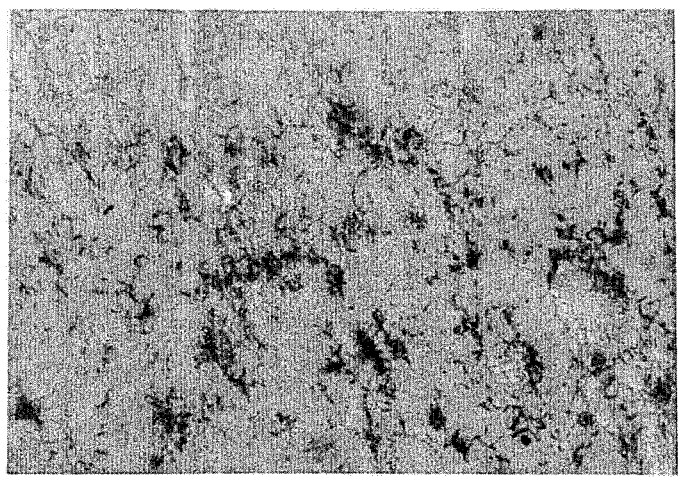

United States Patent [19]
Morimoto et al.

[11] 3,904,709
[45] Sept. 9, 1975

[54] PROCESS FOR PRODUCING THERMOPLASTIC RESINS

[75] Inventors: Masayoshi Morimoto; Tetsutaro Sanjiki; Hideki Horiike; Motonobu Furuta, all of Ichihara, Japan

[73] Assignee: Sumitomo Chemical Company, Limited, Osaka, Japan

[22] Filed: Jan. 15, 1973

[21] Appl. No.: 323,715

[30] Foreign Application Priority Data
Jan. 17, 1972 Japan.................................. 47-7111

[52] U.S. Cl............................ 260/878 R; 260/878
[51] Int. Cl............................................. C08f 15/00
[58] Field of Search ................................ 260/878 R

[56] References Cited
UNITED STATES PATENTS

| | | | |
|---|---|---|---|
| 3,538,190 | 11/1970 | Meredith et al. | 260/878 R |
| 3,538,191 | 11/1970 | Meredith et al. | 260/878 R |
| 3,538,192 | 11/1970 | Bishop | 260/878 R |
| 3,538,193 | 11/1970 | Meredith | 260/878 R |
| 3,642,950 | 2/1972 | O'Shea | 260/878 R |
| 3,657,395 | 4/1972 | Meredith et al. | 260/878 R |
| 3,671,608 | 6/1972 | Meredith et al. | 260/878 R |
| 3,683,050 | 8/1972 | Meredith et al. | 260/878 R |

*Primary Examiner*—Joseph L. Schofer
*Assistant Examiner*—A. Holler
*Attorney, Agent, or Firm*—Stevens, Davis, Miller & Mosher

[57] ABSTRACT

A process for producing a graft co- or terpolymeric thermoplastic resin consisting of an ethylene-propylene rubber and an aromatic vinyl compound or of an ethylene-propylene rubber, an aromatic vinyl compound and a vinyl cyanide compound, characterized by subjecting these materials to solution polymerization in a mixed solvent comprising an aromatic hydrocarbon solvent capable of dissolving the ethylene-propylene rubber and a polar solvent capable of dissolving poly-(aromatic vinyl compound) in the case of the graft-copolymer or aromatic vinyl compound-vinyl cyanide compound copolymer in the case of the graft-terpolymer. The graft-copolymer or graft-terpolymer obtained by the present process is excellent in weather resistance and impact resistance. The impact resistance of the present graft co- or ter-polymer is not affected by processing conditions.

8 Claims, 4 Drawing Figures

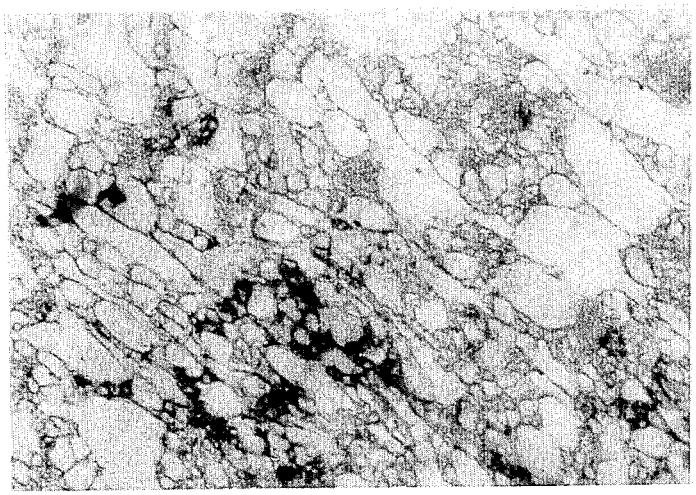
FIG. 2
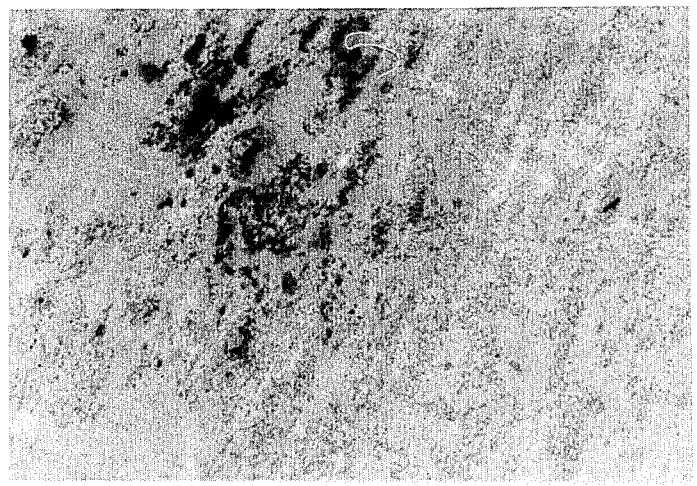

PROCESS FOR PRODUCING THERMOPLASTIC RESINS

This invention relates to a process for producing a thermoplastic resin excellent in impact resistance. More particularly, this invention relates to a solution polymerization process for producing a graft-co- or terpolymer consisting of an ethylene-propylene rubber and an aromatic vinyl compound or of both and a vinyl cyanide compound.

It has hitherto been attempted, in view of the fact that an ethylene-propylene rubber is excellent in weather resistance, to develop a process for producing a graft-copolymer excellent in both impact resistance and weather resistance by graft-copolymerizing styrene or styrene and acrylonitrile on the ethylene-propylene rubber. Most of such processes which have hitherto been known are a bulk polymerization method (U.S. Pat. No. 3,538,192) or an emulsion polymerization method (U.S. Pat. No. 3,435,096), and a solution polymerization method has also been used in some cases (U.S. Pat. Nos. 3,538,190 and 3,538,191).

Although the graft copolymers obtained by the above processes, however, have weather resistance equal to or higher than that of an ABS resin due to the ethylene-propylene rubber used as a rubber component, there still remains such problems that the impact strength of said graft copolymers is generally inferior to that of an ABS resin, and even when there has been obtained a graft copolymer having an impact resistance comparable to that of an ABS resin, the impact strength of such a graft copolymer is greatly affected by processing conditions.

Although various attempts have heretofore been made to obtain a graft-copolymer having impact resistance substantially not affected by processing conditions, that is, impact resistance whose dependency on processing conditions is small, yet no processes have so far been known for producing such a graft-copolymer, and it has been even considered that said dependency is a problem associated primarily with the use of an ethylene-propylene rubber.

As a result of extensive studies to improve the above-mentioned dependency of the impact resistance of a graft-copolymer obtained by using an ethylene-propylene rubber as a rubber component, the present inventors have found a novel process for producing a graft-copolymer consisting of an ethylene-propylene rubber and an aromatic vinyl compound or a graft-terpolymer consisting of an ethylene-propylene rubber, an aromatic vinyl compound, and a vinyl cyanide compound, which has impact resistance hardly affected by processing conditions, that is, an excellent stability against changes in processing conditions. The present inventors have also found that the wide fluctuation in impact resistance of the conventional graft-copolymers depending upon processing conditions is due to a marked difference in microstructure before and after processing.

An object of this invention is to provide a process for producing a graft-copolymer or a graft-terpolymer in which an aromatic vinyl compound or an aromatic vinyl compound and a vinyl cyanide compound are grafted on an ethylene-propylene rubber, which has impact resistance not affected by processing conditions.

Another object of this invention is to provide a process for producing a graft-copolymer having excellent impact resistance.

A further object of this invention is to provide a process for producing a graft-copolymer, the microstructure of which will not be changed in any of the processing steps (under any processing conditions).

Other objects and advantages of this invention will be apparent to those skilled in the art from the following description.

According to this invention, there is provided a process for producing a graft-copolymeric or terpolymeric thermoplastic resin consisting of an ethylene-propylene rubber and an aromatic vinyl compound or of an ethylenepropylene rubber, an aromatic vinyl compound and a vinyl cyanide compound, characterized by subjecting these materials to solution polymerization in a mixed solvent of an aromatic hydrocarbon solvent capable of dissolving the ethylene-propylene rubber and a polar solvent capable of dissolving poly-(aromatic vinyl compound) in the case of the graft-copolymer or aromatic vinyl compound-vinyl cyanide compound copolymer in the case of the graft-terpolymer.

The graft-copolymers or terpolymers obtained by the process of this invention have such excellent performance characteristics as prominent stability to processing, substantially no reduction in impact resistance during processing, and capability of producing a shaped article of smooth surface appearance. Moreover, the process of this invention has an advantage in that since the viscosity of the polymerization system is markedly low as compared with a conventional process, the removal of the reaction heat by agitation and the aftertreatment procedures are easily carried out.

The term "ethylene-propylene rubber" used herein means not only a copolymer of ethylene and propylene (hereinafter referred to as EPM) but also an ethylene-propylene terpolymer (hereinafter referred to as EPDM) composed of ethylene, propylene and, as third component, for example, dicyclopentadiene, ethylidenenorborene, 1,4-hexadiene, 1,5-hexadiene, 2-methyl-1,5-hexadiene, 1,4-cycloheptadiene, or 1,5-cyclooctadiene alone or in combination.

An ethylene-propylene rubber comprising ethylene and propylene in a molar ratio of 5:1 to 1:3 is preferably used. In the case of EPDM, a preferable proportion of unsaturation is 4 to 50 in terms of iodine value. In this invention, it is possible to use the ethylene-propylene rubber jointly with one or more other rubbers; for instance, it is possible to use a rubber component, a blend of EPDM or EPM with one or two members or polybutadiene, polyisoprene, styrene-butadiene rubber, and the like. These rubbers other than the ethylene-propylene rubber can suitably be selected according to the intended object. However, when weather resistance is aimed at, the higher the proportion of the ethylene-propylene rubber in the rubber component, the better; for example, a preferred proportion is within the range from 50 to 100 % by weight.

The aromatic vinyl compounds to be used include, for example, styrene, α-methylstyrene, α-chlorostyrene, dimethylstyrene, etc., styrene being preferred. The vinyl cyanide compounds for use include, for instance, acrylonitrile and methacrylonitrile.

The weight ratio of the vinyl compounds to the rubbers may suitably be selected according to the object; in general, 5 to 20 % by weight of the rubber component is used for 95 to 80 % by weight of the vinyl monomers. On the other hand, in the case where a graft-copolymer is produced for the purpose of improving the compatibility with other rubbers or resins, it is preferable for increasing the degree of grafting that the weight ratio of the rubber component to the vinyl component is as large as possible. For example, a suitable proportion of the rubber component is within the range from 20 to 90 % by weight based on the vinyl monomers.

When the aromatic vinyl compound and the vinyl cyanide compound are grafted on the ethylene-propylene rubber, the weight ratio of both monomers is adjusted within the range from 2:1 to 5:1; for example, in the case of copolymerizing styrene and acrylonitrile, a weight ratio of 70:30 to 75:25 is most suitable.

The aromatic hydrocarbon solvents for use in this invention must be those which dissolve the ethylene-propylene rubber, such as, for example, benzene, toluene, dimethylbenzenes, xylene, ethylbenzene, diethyl benzenes, and triethylbenzenes.

The polar solvents to be used in this invention may dissolve the ethylene-propylene rubber, and must dissolve at least a poly-(aromatic vinyl compound) or a copolymer of the aromatic vinyl compound and the vinyl cyanide compound. Examples of such solvents include ketones such as acetone, methyl ethyl ketone, methyl n-propyl ketone, diethyl ketone, 2-hexanone, 3-hexanone, acetophenone, and propiophenone; esters such as methyl formate, ethyl formate, methyl acetate, ethyl acetate, n-propyl acetate, n-butyl acetate, n-amyl acetate, methyl propionate, methyl n-butyrate, and the like, ethers such as tetrahydrofuran and dioxane; chlorine-substituted aliphatic hydrocarbons such as dichloroethane and chloroform; nitrogen-containing hydrocarbons such as pyridine, aniline, acetonitrile, and dimethylformamide; and sulfur-containing hydrocarbons such as dimethyl sulfoxide. The solubility of the polymer in solvent was judged in the following manner.

A solvent was added to the polymer in an amount of ten times the weight of the latter and the mixture was allowed to stand for 24 hours. After the whole of the system became consequently uniform or the degree of swelling of the polymer was 200 % or more even if the system was ununiform, the system was judged to be dissolved.

One or more solvents selected from each of the above-mentioned two groups of solvents are used as polymerization media in this invention. For example, a solvent system comprising one or more of the above-mentioned hydrocarbon solvents and one or more of the above-mentioned polar solvents may be used. A mixed solvents of 5 to 95 % by weight of a hydrocarbon solvent and 95 to 5 % by weight of a polar solvent is ordinarily used. It is also possible to use either one of the solvents at the initial stage of polymerization and add the other solvent with proceeding of polymerization. The best results are obtained particularly by using at the initial stage of polymerization a hydrocarbon solvent containing 0 to 20 % by weight of a polar solvent, and adding the polar solvent as the polymerization proceeds until the solvent system contains 40 to 60 % by weight of the polar solvent at the final stage of polymerization. The rate of polymerization as well as the state of dispersion of rubber can be freely controlled by regulating timing and quantity in adding the polar solvent as the polymerization proceeds.

Common radical polymerization catalysts are used as the grafting reaction catalyst. Examples of suitable catalysts are peroxides such as benzoyl peroxide, lauroyl peroxide, di-tert-butyl peroxide, acetyl peroxide, tert-butylperoxypivalate, tert-butylperoxybenzoic acid, dicumyl peroxide, peroxybenzoic acid, and peroxyacetic acid; and diazo compounds such as azobisisobutyronitrile.

In this invention, the polymerization catalyst may be added in portions. As compared with the addition of a radical catalyst all at one time at the beginning of polymerization, the portionwise addition has such advantages as acceleration of polymerization, reduction in polymerization time and improvement in physical properties of the end product. The vinyl monomers are also added preferably in portions, because it is possible to obtain in this case a polymer with higher degree of grafting and having superior physical properties as compared with the case of adding as a whole.

The grafting catalyst is used in an amount of 0.1 to 10 % by weight on vinyl monomers. The polymerization temperature is 30° to 120°C., a temperature of 50° to 80°C. being particularly suitable. The polymerization time depends to a great extent on polymerization conditions, and is desirably controlled so that conversion may reach 90 % or higher in 5 to 40 hours.

To separate the polymerization product after completion of polymerization, the reaction mixture is poured into a lower alcohol such as methanol or ethanol with mild agitation to separate the polymerizate in the form of a thick paste swollen with the solvent. The separated polymerizate is formed into a sheeting on a roll mill, then dried by being left standing, and finally dried in vacuo at 100° to 150°C. for several hours. The dried polymer is formed by means of a pelletizer into pellets of suitable size.

The graft-copolymers obtained according to this invention have an excellent impact resistance and their physical properties are hardly affected by processing conditions such as, for example, temperature, pressure and shear stress. As a result of examinations on the reason for such an excellent stability, it was found that the graft-copolymers obtained according to this invention has a microstructure essentially different from that of conventional graft-copolymers which were disclosed in, for example, U.S. Pat. Nos. 3,538,190 or 3,538,191, and that fluctuation in impact resistance of graft-copolymers obtained by the conventional processes such as, for example, those disclosed in U.S. Pat. Nos. 3,538,190 or 3,538,191 is associated with a marked difference in microstructure before and after processing. It may be said that the present invention have found a process for producing a graft-copolymer which shows little difference in microstructure before and after processing, that is, little dependence upon processing conditions, and, moreover, has a higher impact resistance as compared with a conventional graft-copolymer. Some explanation will be given below regarding microstructure of a graft-copolymer.

In terms of the sea and island concept, as described in, for example, G. E. Molou, "Colloid and Morphological Behavior of Block and Graft Copolymer" (published by Plenum Press Co., 1971), microstructure of the graft-copolymer obtained according to this invention is expressed in such a manner that the rubber component forms the island and other components for the sea. The graft-copolymer of this invention shows little change in the microstructure even after having passed through processing steps such as milling on a roll mill and extrusion. On the contrary, the graft-copolymers obtained by the solution processes disclosed in U.S. Pat. Nos. 3,538,190 and 3,538,191 show a reversed microstructure before processing; and the microstructure differs before and after processing depending upon processing conditions.

Figure 4:
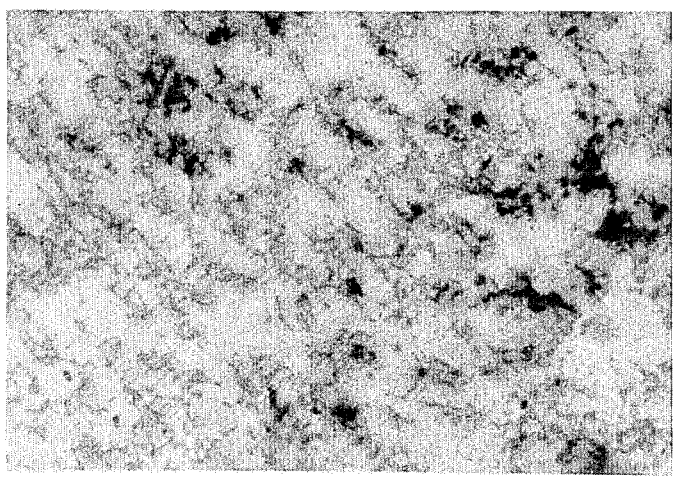

In the accompanied drawings,

FIG. 1 and FIG. 2 are electron micrographs of a conventional ethylene-propylene rubber-styrene-acrylonitrile terpolymer before and after processing, respectively, while FIG. 3 and FIG. 4 are electron micrographs of the present ethylene-propylene rubber-styrene-acrylonitrile terpolymer before and after processing, respectively.

The invention is illustrated below in detail with reference to examples, but the invention is not limited to the examples.

tion, the reaction mixture was poured into methanol to separate a graft-copolymer. The separated copolymer was made into a sheet by means of rolls and dried in vacuo at 150°C. for 3 hours.

Measurements of physical properties were conducted in the following manner: A graft-copolymer was mixed on a 7 in. ϕ × 16 in. roll mill at 170°C. for 10 minutes, and pressed at 200°C. for 10 minutes to prepare a sheet. Dumb-bell-shaped test specimens, JIS pattern No. 3, cut out of the resulting sheet were tested for tensile strength at a stretching speed of 5 mm/min. Measurement of impact strength was conducted according to ASTM D256–56. The results obtained were as shown in Table 1. In Examples 1 – 2 to 1 – 13, polymerization was carried out in the same manner as in Example 1 — 1, using various solvents shown in Table 1. Tensile strengths and impact strengths of the resulting graft-copolymers were as shown in Table 1. Each 50 g of an aromatic hydrocarbon solvent were used to dilute acrylonitrile and the catalysts.

The remainder was used to dissolve EPDM.

Table 1

| Example No. | Solvent Compound | (g) | EPDM, % (by wt.) | Acrylo- nitrile, g | Styrene, g | Benzoyl peroxide, g | Polymeri- zation time, hour | Tensile strength, kg/cm² | Impact strength, notched Izod, kg-ch/cm² |
|---|---|---|---|---|---|---|---|---|---|
| 1-1 | Toluene | 710 | | | | | | | |
| | Acetone | 300 | 12.3 | 97.5 | 292.5 | 3.9 | 21.0 | 345 | 12.5 |
| 1-2 | Toluene | 710 | | | | | | | |
| | Acetonitrile | 300 | 12.1 | " | " | " | " | 306 | 12.7 |
| 1-3 | Toluene | 710 | | | | | | | |
| | Dioxane | 300 | 11.8 | " | " | " | 19.0 | 392 | 14.3 |
| 1-4 | Toluene | 710 | | | | | | | |
| | Ethyl acetate | 300 | 12.6 | " | " | " | 23.0 | 335 | 16.3 |
| 1-5 | Toluene | 650 | | | | | | | |
| | Chloroform | 650 | 11.7 | " | " | " | 22.0 | 360 | 19.1 |
| 1-6 | Toluene | 500 | | | | | | | |
| | Ethylene dichloride | 500 | 11.3 | " | " | " | 22.0 | 343 | 22.7 |
| 1-7 | Toluene | 500 | | | | | | | |
| | Acetone | 500 | 13.1 | 97.5 | 292.5 | 3.9 | 23.0 | 309 | 15.6 |
| 1-8 | Toluene | 500 | | | | | | | |
| | Methyl ethyl ketone | 500 | 12.2 | " | " | " | 23.5 | 341 | 12.7 |
| 1-9 | Toluene | 500 | | | | | | | |
| | Dioxane | 500 | 11.5 | 97.5 | 292.5 | 3.9 | 21.0 | 368 | 14.9 |
| 1-10 | Toluene | 500 | | | | | | | |
| | Ethyl acetate | 500 | 12.0 | " | " | " | 23.0 | 364 | 20.0 |
| 1-11 | Toluene | 500 | | | | | | | |
| | Methyl iso- butyl ketone | 500 | 11.8 | " | " | " | 23.0 | 361 | 13.9 |
| 1-12 | Toluene | 600 | | | | | | | |
| | Ethyl acetate | 600 | 15.4 | 100 | 300 | 2.4 | 29.5 | 335 | 48.6 |
| 1-13 | Toluene | 600 | | | | | | | |
| | Ethyl acetate | 600 | 14.6 | 100 | 300 | 3.2 | 29.0 | 356 | 33.0 |

EXAMPLES 1 — 1 to 1 – 13.

In 610 g of toluene placed in a 2-liter separable flask provided with a Dimroth condenser, a thermometer, a glass tube for bubbling a gas, a Hopkins cooler, and a stirrer with two turbine-type blades, were thoroughly dissolved 45 g of EPDM having an iodine value of 18.7, a Mooney viscosity of 40, and containing 34.7 % by weight of propylene and ethylidenenorborene as a diene component. To the solution in the flask were added 292.5 g of styrene, 97.5 g of acrylonitrile diluted with 50 g of toluene, and 3.9 g of benzoyl peroxide diluted with 50 g of toluene. While rotating the stirrer at 600 rpm, polymerization was allowed to proceed under an atmosphere of argon at 70°C. When conversion reached 15 %, 300 g of acetone was added dropwise and the reaction was continued until conversion reached 90 % or higher. After completion of the reac- Stability of the impact resistance of the sample obtained in Example 1 – 10 was as shown in Tables 2 and 3

Table 2

Effect of mixing conditions when a roll-mill is used.

| Milling conditions | | | Impact resistance, notched Izod, kg-cm/cm² |
|---|---|---|---|
| Temperature | Time, min. | Nip, mm. | |
| 160 | 10 | 0.1 | 24.1 |
| 170 | 10 | 0.1 | 23.0 |
| 180 | 20 | 0.1 | 21.8 |
| 170 | 5 | 0.1 | 28.4 |
| 170 | 10 | 0.1 | 23.0 |

Table 2-Continued

Effect of mixing conditions when a roll-mill is used.

| Milling conditions | | | Impact resistance, |
|---|---|---|---|
| Temperature | Time, min. | Nip, mm. | notched Izod, kg-cm/cm² |
| 170 | 15 | 0.1 | 21.8 |
| 170 | 20 | 0.1 | 20.5 |
| 170 | 30 | 0.1 | 19.7 |
| 170 | 10 | 0.01 | 22.7 |

Table 3

Effect of pressing conditions

| Pressing conditions | | | Impact resistance, |
|---|---|---|---|
| Temperature,°C. | Time, min. | Cooling | notched Izod, kg-cm/cm² |
| 180 | 10 | Rapid | 21.7 |
| 180 | 10 | Rapid | 22.4 |
| 200 | 10 | Rapid | 23.0 |
| 200 | 10 | Slow | 24.8 |
| 200 | 20 | Rapid | 23.8 |
| 200 | 20 | Slow | 24.7 |

Pressing conditions:
Preheating: 200°C., 5 minutes; pressurizing:
0 to 100 kg/cm², 3 minutes; pressing:
100 kg/cm², 2 minutes; rapid cooling: tap water,
5 minutes; slow cooling: natural cooling.

Comparative Example 1

Following the procedure of Example 1, polymerization was conducted in a mixed solvent system comprising n-hexane and toluene, as described in U.S. Pat. No. 3,538,190. The relation between processing conditions and impact resistance was as shown in Table 4.

Table 4

Effect of mixing conditions when a roll-mill is used

| Milling conditions | | | Impact resistance, |
|---|---|---|---|
| Temperature,°C. | Time, min. | Nip, mm. | notched Izod, kg-cm/cm² |
| 170 | 10 | 0.3 | 21.3 |
| 170 | 3 | 0.1 | 17.4 |
| 170 | 5 | 0.1 | 7.7 |
| 170 | 10 | 0.1 | 2.2 |
| 170 | 20 | 0.1 | 2.3 |
| 170 | 30 | 0.1 | 2.1 |
| 170 | 10 | 0.01 | 2.1 |

Electron microscopic photographs before and after processing of a graft copolymer obtained in Example 1 - 10 and a conventional graft-copolymer obtained by polymerizing in toluene solvent in a manner similar to that in Example 1 were as shown in FIGS. 1 to 4. The ultrathin sections for use in the electron microscopic photography were prepared in the following manner:

In the case of a sample before processing, a film was cast from the polymerization solution and the film was then cut to ultrathin sections. A processed sample was milled on a roll-mill and then pressed to form a film which was cut to ultrathin sections.

FIG. 1 and FIG. 2 show respective sections of unprocessed and processed samples of a copolymer prepared by a known process, while FIG. 3 and FIG. 4 show respective sections of unprocessed and processed samples of a copolymer prepared by the present process. Magnification of the electron microscopic photograph was 13,000 and hence a length of 1.3 cm in the photograph corresponds to 1 μ.

As is clearly seen from FIGS. 1 to 4, the type of rubber dispersion in the graft-copolymer of this invention differs markedly from that in a copolymer obtained by polymerization in a hydrocarbon solvent, as disclosed in U.S. Pat. No. 3,538,190. In the former type of rubber component forms island and the styrene-acrylonitrile copolymer forms sea, while the reverse is the case with the latter type. When these copolymers are treated by a roll-mill or an extruder, the former type shows substantially no change, whereas in the latter type, the sea-to-island relation is reversed, that is to say, the rubber component becomes island and the styrene-acrylonitrile copolymer becomes sea. The above-mentioned fact corresponds to the fact that impact resistance of the graft-copolymer of this invention is not significantly affected by processing steps, whereas that of a conventional copolymer is markedly affected.

EXAMPLE 2

Polymerization was carried out in a mixed solvent comprising 600 g of toluene and 600 g of ethyl acetate for 23 hours in the same manner as in Example 1 - 13, except that polymerization temperature was 60°C. There was obtained a graft-copolymer containing 12 % of rubber component and having the following physical properties:

| | |
|---|---|
| Tensile strength: | 406 kg/cm² |
| Notched Izod impact strength: | 28.0 kg-cm/cm² |

EXAMPLE 3

In a manner similar to that in Example 1 -13 and using an EPDM which had an iodine value of 18.0, a Mooney viscosity of 75, and a propylene content of 40.0 % by weight and contained ethylidenenorbornene as a diene component, polymerization was conducted in a mixed solvent of 600 g of toluene and 600 g of ethyl acetate. The catalyst was added in two portions, one half being added at the beginning and the remainder during polymerization. Physical properties of the resulting graft-copolymer (rubber content, 12.3 %) were as shown below.

| | |
|---|---|
| Tensile strength: | 420 kg/cm² |
| Notched Izod impact strength: | 26.4 kg-cm/cm² |

EXAMPLE 4

In a 2-liter, separable flask provided with a Dimaroth condenser, a thermometer, a glass tube for bubbling a gas, a Hopkins cooler, a stirrer with two turbine-type blades, and a dropping funnel, were charged 500 g of toluene and 50.0 g of an EPDM having an iodine value of 17.5, a Mooney viscosity of 77 and a propylene content of 44.6 and containing ethylidenenorbornene as a diene component. After thorough dissolution had been confirmed, to the solution were added 50 g of styrene, 16.7 g of acrylonitrile diluted with 25 g of toluene and 1 g of benzoyl peroxide diluted with 25 g of toluene. While agitating with a stirrer rotating at 600 rpm, polymerization was allowed to proceed under an atmosphere of argon at 70°C. When conversion reached 50 % or higher, 250 g of styrene, 83.3 g of acrylonitrile diluted with 25 g of toluene, and 3 g of benzoyl peroxide diluted with 25 g of toluene were added and the polymerization was continued. When conversion (based on total amount of added monomers) reached 20 % or more, 600 g of ethyl acetate was added dropwise, and the polymerization was continued for 25 hours. The aftertreatment was carried out in a manner similar to that in Example 1 to obtain a graft copolymer having a rubber content of 12.4 %. Physical properties of this copolymer were as shown below.

| | |
|---|---|
| Tensile strength: | 402 kg/cm² |
| Notched Izod impact strength: | 31.3 kg-cm/cm² |

EXAMPLE 5

In a manner similar to that in Example 1 – 13 and using a rubber component a blend of 10 g of a polybutadiene, "NF 35A" (produced by Asahi Chemical Industry Co.) and 40 g of EPDM used in Example 1, polymerization was conducted in a mixed solvent of 600 g of toluene and 600 g of ethyl acetate for 32 hours to obtain a graft-copolymer of 11.8 % rubber content. Physical properties were as shown below.

| | |
|---|---|
| Tensile strength: | 397 kg/cm² |
| Notched Izod impact strength: | 27.4 kg-cm/cm² |

EXAMPLE 6

In a polymerization apparatus similar to that in Example 1, 45 g of the same EPDM as used in Example 1 was dissolved in 550 g of toluene. To the solution, were added 400 g of styrene and 4 g of benzoyl peroxide diluted with 50 g of toluene. Polymerization was conducted under an atmosphere of argon at 70°C., while being stirred with a stirrer rotating at 600 rpm. When conversion reached 50 %, 600 g of ethylene dichloride was added dropwise and polymerization was carried out for 23 hours to obtain a graft-copolymer of 10.2 % rubber content. Physical properties of the copolymer were as shown below

| | |
|---|---|
| Tensile strength: | 275 kg/cm² |
| Notched Izod impact strength: | 13.2 kg-cm/cm² |

EXAMPLE 7

In a polymerization apparatus similar to that in Example 1, 45 g of the same EPDM used in Example 1 was dissolved in 550 g of toluene. To the solution were added 400 g of styrene and 3 g of benzoyl peroxide diluted with 50 g of toluene. Polymerization was conducted under an atmosphere of argon at 70°C., while being stirred with a stirrer rotating at 800 rpm. When conversion reached 15 %, 600 g of ethylene dichloride was added dropwise and polymerization was carried out for 25 hours to obtain a graft-copolymer of 12.4 % rubber content. Physical properties of the copolymer were as shown below.

| | |
|---|---|
| Tensile strength: | 248 kg/cm² |
| Notched Izod impact strength: | 15.3 kg-cm/cm² |

EXAMPLE 8

In a polymerization apparatus similar to that used in Example 1, 25 g of the same EPDM as used in Example 1 and 20 g of "SBR 1507" (produced by Japan Synthetic Rubber Co.) were dissolved in 550 g of toluene. To the solution were added 400 g of styrene, 3 g of benzoyl peroxide diluted with 50 g of toluene, and 600 g of methyl ethyl ketone. Polymerization was conducted under an atmosphere of argon at 70°C. for 24 hours, while being stirred with a stirrer rotating at 800 rpm, to obtain a graft-copolymer of 13 % rubber content. Physical properties of the copolymer were as shown below.

| | |
|---|---|
| Tensile strength: | 250 kg/cm² |
| Notched Izod impact strength: | 16.7 kg-cm/cm² |

What is claimed is:

1. In a process for producing a graft-co or terpolymeric thermoplastic resin consisting of an ethylene-propylene rubber and an aromatic vinyl compound or of an ethylene-propylene rubber, an aromatic vinyl compound and a vinyl cyanide compound by using a radical catalyst, the improvement which comprises subjecting these materials to solution polymerization at a temperature of 30° to 120°C for 5 to 40 hours in a mixed solvent consisting of 95 to 5% by weight of at least one aromatic hydrocarbon solvent capable of dissolving the ethylene-propylene rubber and 5 to 95% by weight of at least one polar solvent capable of dissolving poly (aromatic vinyl compound) in the case of the graft-copolymer or aromatic vinyl compound-vinyl cyanide compound copolymer in the case of the graft-terpolymer, the aromatic hydrocarbon solvent being selected from the group consisting of benzene, toluene, dimethylbenzene, xylene, ethylbenzene, diethylbenzene, and triethylbenzene, the polar solvent being selected from the group consisting of ketones, esters, ethers, chlorine-substituted aliphatic hydrocarbons, nitrogen-containing hydrocarbons and sulfur-containing hydrocarbons, the ethylene-propylene rubber comprising ethylene and propylene in a molar ratio of from 5.1 to 1:3 and being selected from the group consisting of two-component polymer comprising ethylene and propylene and ethylene-propylene-diene terpolymer containing as the third component a diene selected from the group consisting of dicyclopentadiene, ethylidenenorbornene, 1,4-hexadiene, 1-5-hexadiene, 2-methyl-1, 5-hexadiene, 1,4-cycloheptadiene, 1,5-cyclooctadiene and mixtures thereof and having an iodine value of 4 to 50, the aromatic vinyl component being selected from the group consisting of styrene, α-methylstyrene, α-chlorostyrene and diemthylstyrene, and the vinyl cyanide compound being selected from the group consisting of acrylonitrile and methacrylonitrile.

2. A process according to claim 1, wherein the solution polymerization is effected in the presence of a radical polymerization catalyst in an amount of 0.1 – 10 % by weight based on the total weight of the vinyl monomers.

3. A process according to claim 1, wherein the catalyst is added in portions.

4. A process according to claim 1, wherein the polar solvent is at least one member selected from the group consisting of acetone, methyl ethyl ketone, methyl n-propyl ketone, diethyl ketone, 2-hexanone, 3-hexanone, acetophenone, propiophenone, methyl formate, ethyl formate, methyl acetate, ethyl acetate, n-propyl acetate, n-butyl acetate, n-amyl acetate, methyl propionate, methyl n-butyrate, tetrahydrofuran, dioxane, dichloroethane, chloroform, pyridine, aniline, acetonitrile, dimethylformamide and dimethyl sulfoxide.

5. A process according to claim 1, wherein the catalyst is selected from the group consisting of benzoyl peroxide, lauroyl peroxide, di-t-butyl peroxide, acetyl peroxide, t-butyl peroxybenzoic acid, dicumyl peroxide, peroxybenzoic acid, peroxyacetic acid, tert-butylperoxypivalate and azobisisobutyronitrile.

6. A process according to claim 1, wherein the weight ratio of the vinyl aromatic compound to the vinyl cyanide compound is 2:1 to 5:1.

7. A process according to claim 1, wherein styrene and acrylonitrile are graft-copolymerized in a weight ratio of 70:30 to 75:25 on the rubber.

8. A process according to claim 1, wherein 95 to 80% by weight of the aromatic vinyl or a mixture of the aromatic vinyl and the vinyl cyanide is graft-copolymerized on 5 to 20% by weight of the rubber based upon the weight of combined monomer and rubber.

* * * * *